US008261192B2

(12) United States Patent
Djabarov

(10) Patent No.: US 8,261,192 B2
(45) Date of Patent: Sep. 4, 2012

(54) PROVIDING USEFUL INFORMATION ASSOCIATED WITH AN ITEM IN A DOCUMENT

(75) Inventor: Gueorgui Djabarov, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/250,958

(22) Filed: Sep. 30, 2011

(65) Prior Publication Data

US 2012/0023391 A1 Jan. 26, 2012

Related U.S. Application Data

(63) Continuation of application No. 11/010,316, filed on Dec. 14, 2004.

(51) Int. Cl.
*G06F 17/30* (2006.01)
(52) U.S. Cl. ........................ 715/738; 715/501.1; 707/3
(58) Field of Classification Search .................. 715/205, 715/738, 781
See application file for complete search history.

(56) References Cited

U.S. PATENT DOCUMENTS

| | | | |
|---|---|---|---|
| 5,377,323 A | 12/1994 | Vasudevan | |
| 5,506,984 A | 4/1996 | Miller | |
| 5,745,908 A | 4/1998 | Anderson et al. | |
| 5,815,830 A | 9/1998 | Anthony | |
| 5,903,889 A | 5/1999 | de la Huerga et al. | |
| 5,950,159 A | 9/1999 | Knill | |
| 6,078,914 A | 6/2000 | Redfern | |
| 6,122,647 A * | 9/2000 | Horowitz et al. | 715/205 |
| 6,434,567 B1 | 8/2002 | de la Huerga et al. | |
| 6,445,468 B1 | 9/2002 | Tsai | |
| 6,507,837 B1 | 1/2003 | de la Huerga et al. | |
| 6,516,321 B1 | 2/2003 | de la Huerga et al. | |
| 6,870,828 B1 * | 3/2005 | Giordano, III | 370/352 |
| 6,948,135 B1 | 9/2005 | Ruthfield et al. | |
| 7,013,298 B1 | 3/2006 | de la Huerga et al. | |
| 7,165,221 B2 * | 1/2007 | Monteleone et al. | 715/738 |
| 7,322,047 B2 | 1/2008 | Redlich et al. | |
| 7,912,705 B2 * | 3/2011 | Wasson et al. | 704/9 |
| 2003/0167162 A1 | 9/2003 | Simpson et al. | |
| 2006/0005113 A1 | 1/2006 | Baluja et al. | |
| 2006/0129910 A1 | 6/2006 | Djabarov et al. | |
| 2010/0010968 A1 | 1/2010 | Redlich et al. | |

FOREIGN PATENT DOCUMENTS

WO WO 98/56159 12/1998

(Continued)

OTHER PUBLICATIONS

M. Blake et al., "Just in Case Linking vs. Just-in-Time—The Library Without Walls Experience", DL 1999, Berkeley, CA, pp. 217-218.

(Continued)

*Primary Examiner* — Mark Rinehart
*Assistant Examiner* — Meseker Takele
(74) *Attorney, Agent, or Firm* — Harrity & Harrity, LLP

(57) ABSTRACT

A method includes recognizing an item within a first document based on a pattern associated with the item but not the exact content of the item. The method further includes identifying a link for the item and providing a second document that includes information associated with the item when the link for the item is selected.

18 Claims, 16 Drawing Sheets

FOREIGN PATENT DOCUMENTS

WO      WO 01/86390      11/2001

OTHER PUBLICATIONS

H. Van de Sompel et al., "Part 1: Framworks for Linking", Reference Linking in a Hybrid Library Environment, D-Lib Magazine, Apr. 1999, vol. 5, Issue 4, 11 pages.

H. Van de Sompel et al., "Part 2: SFX, a Generic Linking Solution", Reference Linking in a Hybrid Library Environment, D-Lib Magazine, Apr. 1999, vol. 5, Issue 4, 13 pages.

H. Van de Sompel et al., "Part 3: Generalizing the SFX Solution in the "SFX@Ghent & SFX&LANL" Experiment", Reference Linking in a Hybrid Library Environment, D-Lib Magazine, Oct. 1999, vol. 5, No. 10, 26 pages.

International Search Report dated Mar. 31, 2006, 3 pages.

Kohda et al., "Ubiquitous advertising on the WWW: Merging advertisement on the browser", Computer Networks and ISDN Systems 28, pp. 1493-1499, 1996.

Hartman et al., "Index-based hyperlinks", Computer Networks and ISDN Systems 29, pp. 1129-1135, 1997.

Jim Powell et al., "Integrated Office XP Smart Tags with Microsoft. NET Platform", msdn.Microsfot.com, Oct. 2001, 6 pages.

"'Smart Tags' link to another Microsoft controversy", USA Today, Jun. 8, 2001, 2 pages.

Scott Ard, "Microsoft clips Windows XP Smart Tags", CNET News. com, Jun. 27, 2001, 2 pages.

Graham, I., "The HTML Sourcebook", John Wiley & Sons, 1995 (ISBN 0471118494), pp. iii-viii, 22-27, 87-88, 166-168, 409-416.

Thistlewaite, P., "Automatic Construction and Management of Large Open Webs", Information Processing and Management: An International Journal, vol. 33, No. 2, Mar. 1997, pp. 161-173 (ISSN 0306-4573).

Myka, A., "Automatic Hypertext Conversion of Paper Document Collections", Digital Libraries Workshop DL '94, Newark, NJ, May 1994, pp. 65-90.

Mills, T., "Providing world wide access to historical sources", Computer Networks and ISDN Systems, vol. 29, Nos. 8-13, Sep. 1997, pp. 1317-1325.

\* cited by examiner

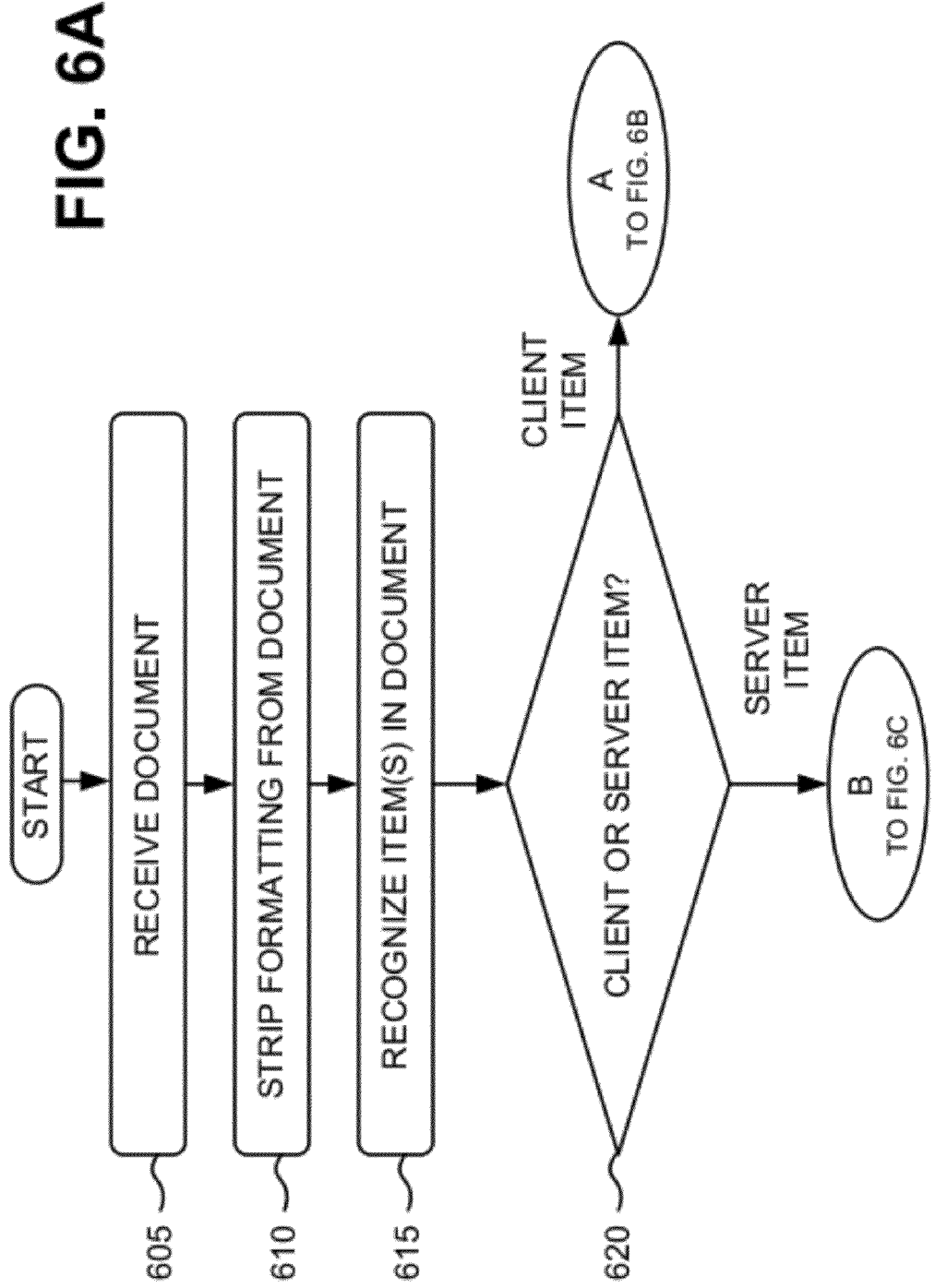

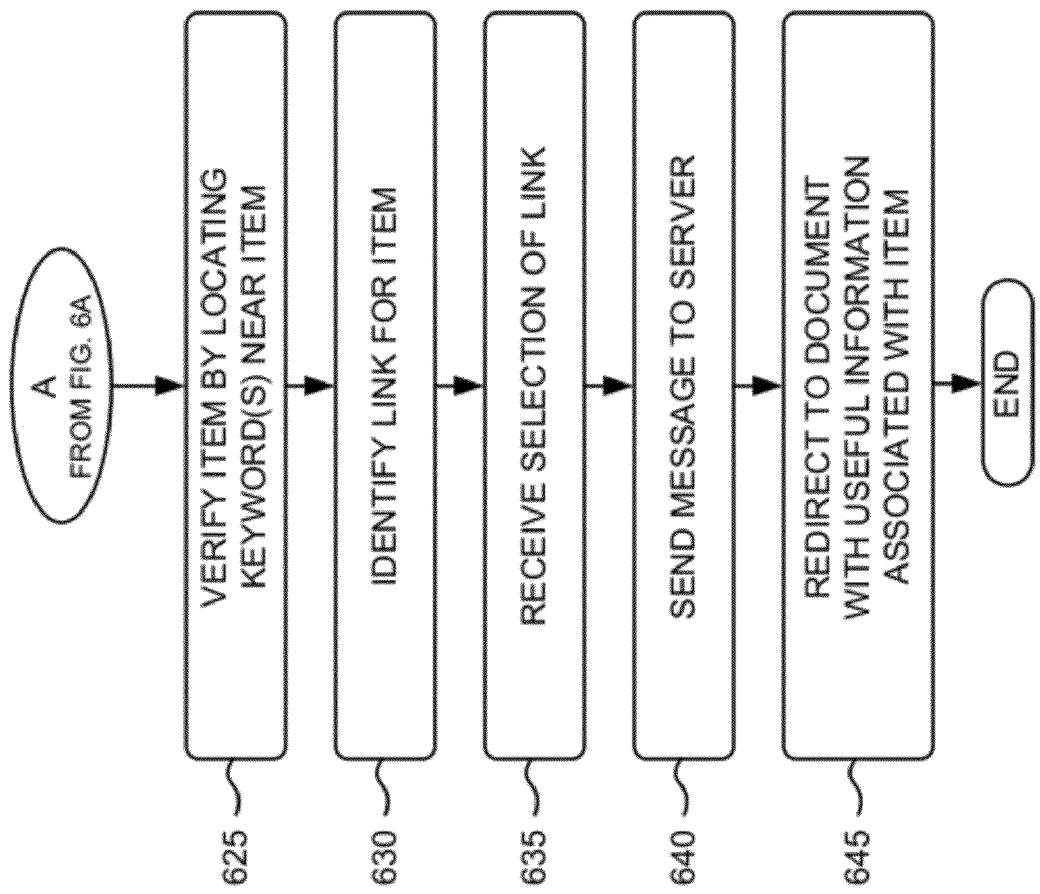

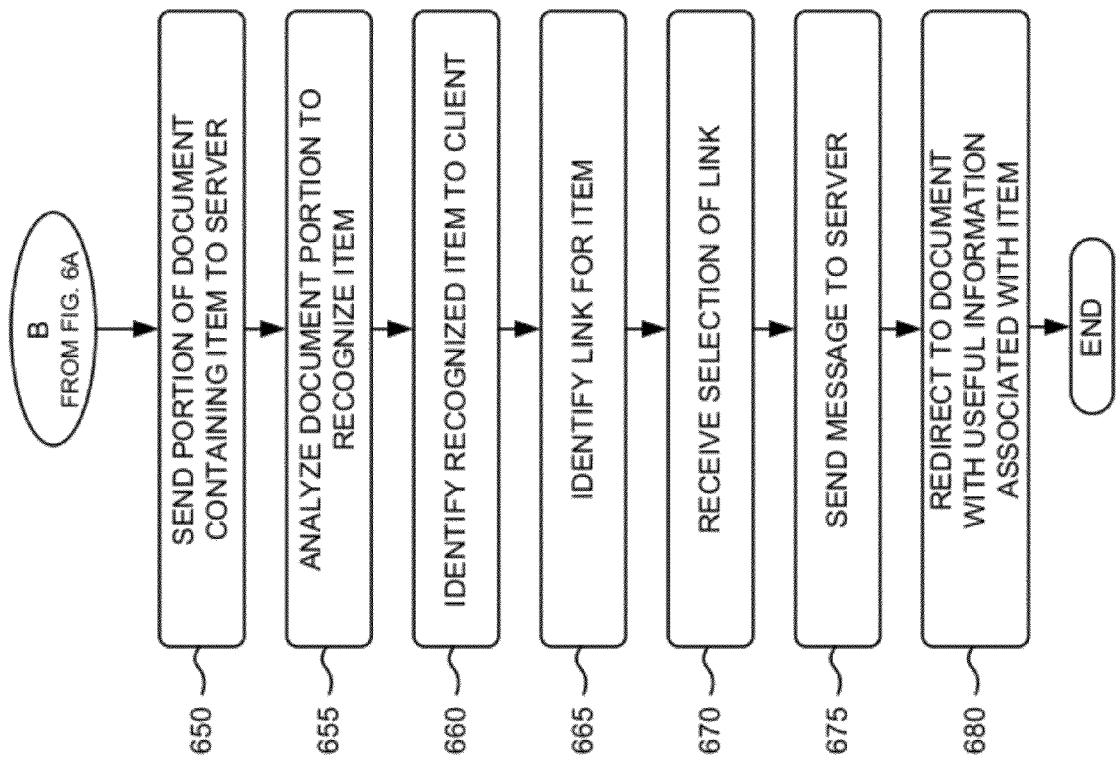

PROVIDING USEFUL INFORMATION ASSOCIATED WITH AN ITEM IN A DOCUMENT

RELATED APPLICATION

This application is a continuation of U.S. application Ser. No. 11/010,316, filed Dec. 14, 2004, the entire disclosure of which is incorporated herein by reference.

BACKGROUND

1. Field of the Invention

Implementations relate generally to information retrieval and, more particularly, to the presentation of useful information associated with items in documents.

2. Description of Related Art

Modern computer networks, and in particular, the Internet, have made large bodies of information widely and easily available. Internet search engines, for instance, index many millions of web documents that are linked to the Internet. A user connected to the Internet can enter a simple search query to quickly locate web documents relevant to the search query.

Sometimes a user desires more information about an item in a web document that the web document itself does not provide.

SUMMARY

According to one aspect, a computer-readable medium includes computer-executable instructions, including instructions for obtaining a first document; instructions for recognizing an item within the first document based on a pattern associated with the item but not the exact content of the item; instructions for identifying a link for the item; and instructions for providing a second document that includes information associated with the item when the link for the item is selected.

According to another aspect, a method includes recognizing an item in a first document; verifying recognition of the item by locating one or more keywords within a predetermined distance of the item in the first document; identifying a link for the item when recognition of the item has been verified; and providing a second document that includes information associated with the item when the link for the item is selected.

According to a further aspect, a computer-readable medium includes computer-executable instructions, including instructions for recognizing an item in a first document and instructions for transmitting a portion of the first document, where the portion includes less than all of the first document. The computer-readable medium further includes instructions for receiving identification of the item, instructions for identifying a link for the item, and instructions for providing a second document that includes information associated with the item when the link for the item is selected.

BRIEF DESCRIPTION OF THE DRAWINGS

The accompanying drawings, which are incorporated in and constitute a part of this specification, illustrate an embodiment of the invention and, together with the description, explain the invention. In the drawings.

FIGS. 6A-6C are flowcharts of exemplary processing for presenting useful information relating to an item in a document according to an implementation consistent with the principles of the invention;

DETAILED DESCRIPTION

The following detailed description of the invention refers to the accompanying drawings. The same reference numbers in different drawings may identify the same or similar elements. Also, the following detailed description does not limit the invention.

Overview

Figure 1:
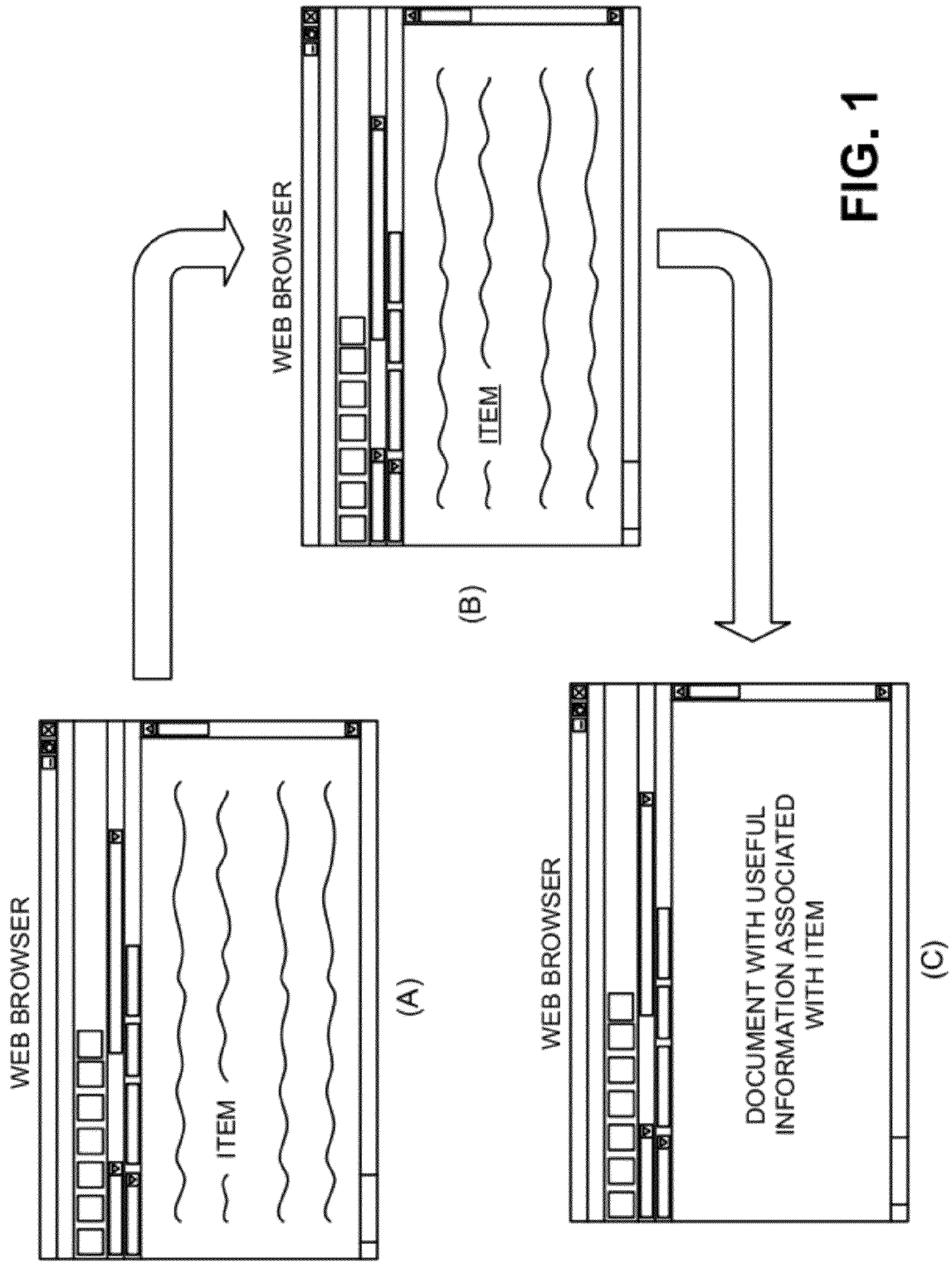
FIG. 1 is an exemplary diagram illustrating a concept consistent with the principles of the invention.

Systems and methods consistent with the principles of the invention may provide useful information associated with an item in a document. FIG. 1 is an exemplary diagram illustrating a concept consistent with the principles of the invention. As shown at (A), a user may access a document, such as a web page, using a web browser. The document includes, among other things, an item of information. As shown at (B), the item may be supplemented or replaced with a link (where the underlining denotes a link). As shown at (C), selection of the link may cause another document to be presented to the user, where this other document may include useful information associated with the item.

A "document," as the term is used herein, is to be broadly interpreted to include any machine-readable and machine-storable work product. A document may include, for example, an e-mail, a web site, a file, a combination of files, one or more files with embedded links to other files, a news group posting, a blog, a web advertisement, etc. In the context of the Internet, a common document is a web page. Web pages often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

Exemplary Network Configuration

Figure 2:
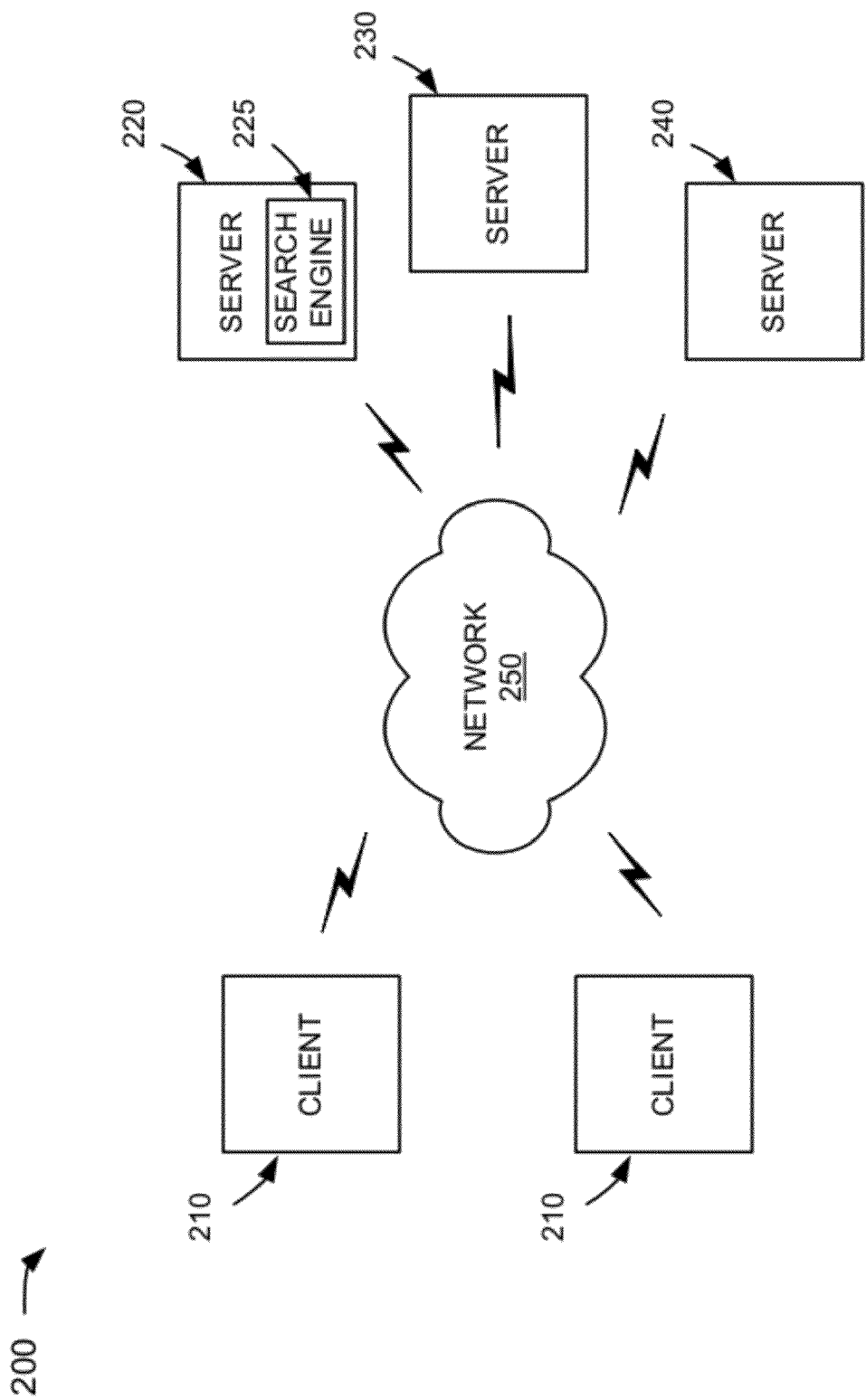
FIG. 2 is an exemplary diagram of a network in which systems and methods consistent with the principles of the invention may be implemented.

FIG. 2 is an exemplary diagram of a network 200 in which systems and methods consistent with the principles of the invention may be implemented. Network 200 may include multiple clients 210 connected to multiple servers 220-240 via a network 250. Two clients 210 and three servers 220-240 have been illustrated as connected to network 250 for simplicity. In practice, there may be more or fewer clients and servers. Also, in some instances, a client may perform the functions of a server and a server may perform the functions of a client.

Clients 210 may include client entities. An entity may be defined as a device, such as a wireless telephone, a personal computer, a personal digital assistant (PDA), a lap top, or another type of computation or communication device, a thread or process running on one of these devices, and/or an object executable by one of these devices. Servers 220-240 may include server entities that gather, process, search, and/or maintain documents in a manner consistent with the principles of the invention.

In an implementation consistent with the principles of the invention, server 220 may include a search engine 225 usable by clients 210. Server 220 may crawl a corpus of documents (e.g., web documents), index the documents, and store information associated with the documents in a repository of documents. Servers 230 and 240 may store or maintain documents that may be crawled or analyzed by server 120.

While servers 220-240 are shown as separate entities, it may be possible for one or more of servers 220-240 to perform one or more of the functions of another one or more of servers 220-240. For example, it may be possible that two or more of servers 220-240 are implemented as a single server. It may also be possible for a single one of servers 220-240 to be implemented as two or more separate (and possibly distributed) devices.

Network 250 may include a local area network (LAN), a wide area network (WAN), a telephone network, such as the Public Switched Telephone Network (PSTN), an intranet, the Internet, a memory device, or a combination of networks. Clients 210 and servers 220-240 may connect to network 250 via wired, wireless, and/or optical connections.

Exemplary Client/Server Architecture

Figure 3:
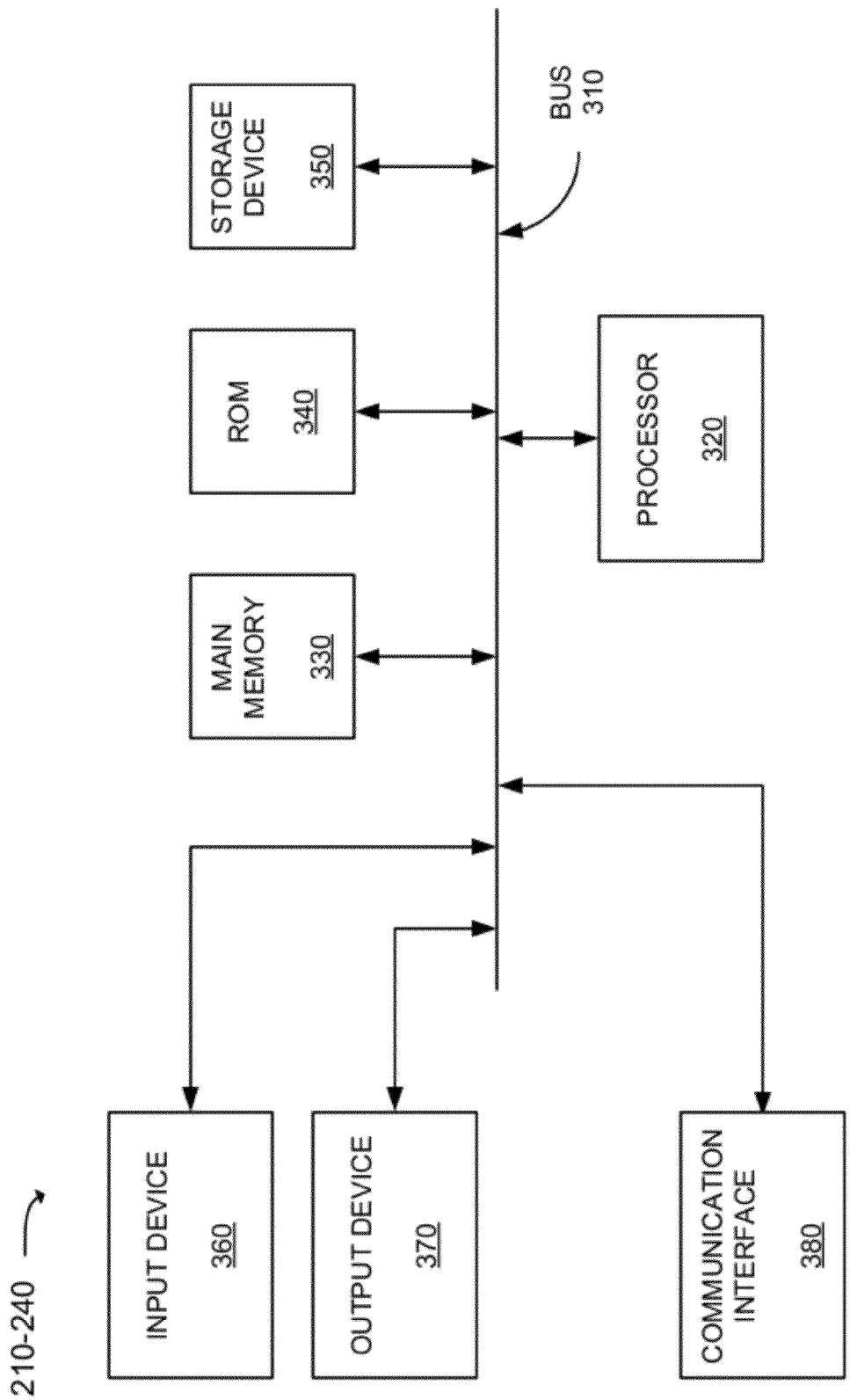
FIG. 3 is an exemplary diagram of a client or server of FIG. 2 according to an implementation consistent with the principles of the invention.

FIG. 3 is an exemplary diagram of a client or server entity (hereinafter called "client/server entity"), which may correspond to one or more of clients 210 and/or servers 220-240, according to an implementation consistent with the principles of the invention. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a conventional processor, microprocessor, or processing logic that interprets and executes instructions. Main memory 330 may include a random access memory (RAM) or another type of dynamic storage device that may store information and instructions for execution by processor 320. ROM 340 may include a conventional ROM device or another type of static storage device that may store static information and instructions for use by processor 320. Storage device 350 may include a magnetic and/or optical recording medium and its corresponding drive.

Input device 360 may include a conventional mechanism that permits an operator to input information to the client/server entity, such as a keyboard, a mouse, a pen, voice recognition and/or biometric mechanisms, etc. Output device 370 may include a conventional mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 250.

As will be described in detail below, the client/server entity, consistent with the principles of the invention, may perform certain document processing-related operations. The client/server entity may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Computer-Readable Medium

Figure 4:
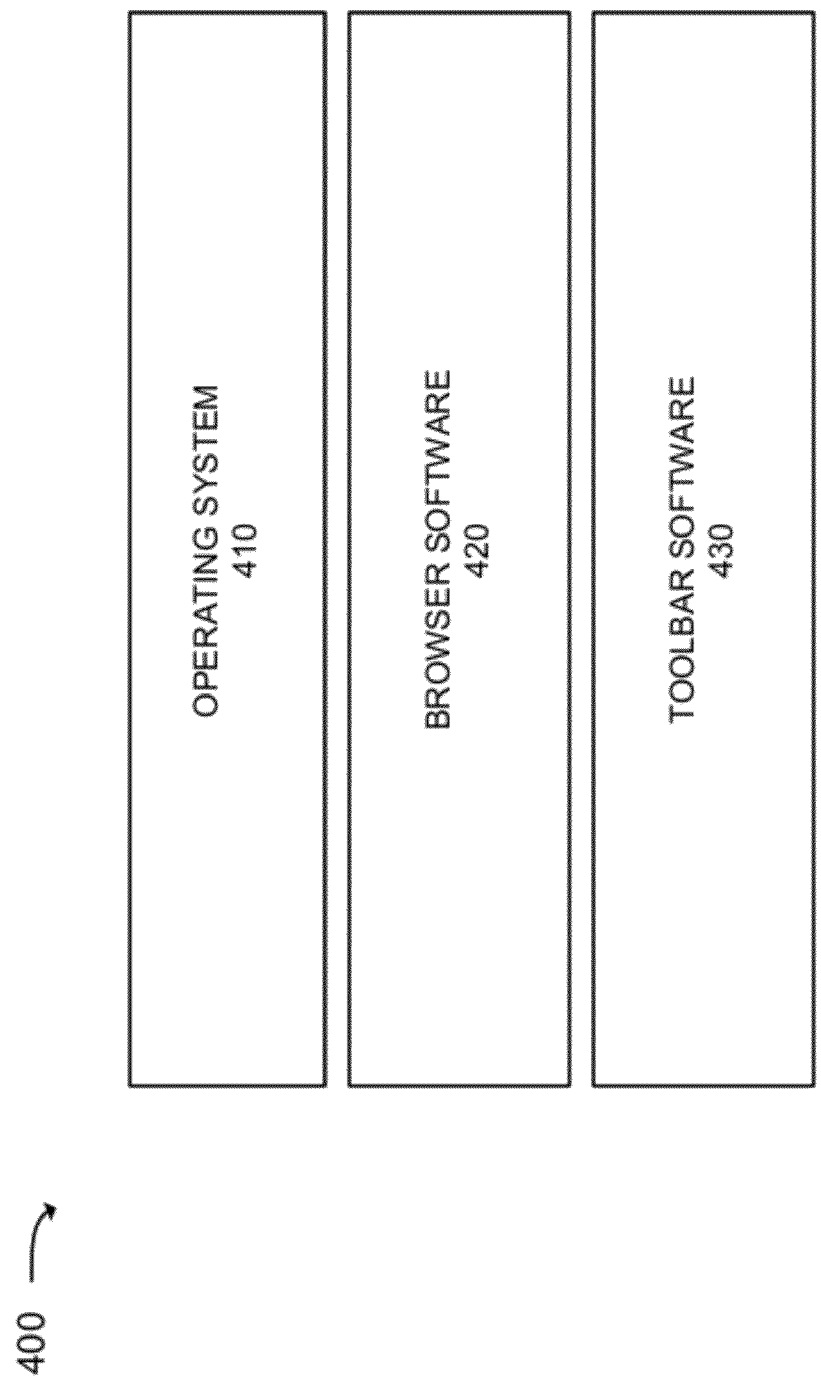
FIG. 4 is a diagram of a portion of an exemplary computer-readable medium that may be used by a client according to an implementation consistent with the principles of the invention.

FIG. 4 is a diagram of a portion of an exemplary computer-readable medium 400 that may be used by a client 210 according to an implementation consistent with the principles of the invention. In one implementation, computer-readable medium 400 may correspond to memory 330 of a client 210. The portion of computer-readable medium 400 illustrated in FIG. 4 may include an operating system 410, browser software 420, and toolbar software 430.

Operating system 410 may include conventional operating system software, such as the Windows, Unix, or Linux operating systems. Browser software 420 may include software associated with a conventional web browser, such as the Microsoft Internet Explorer, Netscape Navigator, or Mozilla Firefox browser.

Toolbar software 430 may include a plug-in, an applet, a dynamic link library (DLL), or a similar executable object or process. Client 210 may obtain the plug-in from server 220 or from a third party, such as a third party server, disk, tape, network, CD-ROM, etc. Alternatively, the plug-in may be pre-installed on client 210.

Toolbar software 430 may cause a toolbar, or another type of user interface, to be implemented within a web browser window. The toolbar may operate in conjunction with the web browser. In another implementation, the toolbar is part of the web browser. In this latter implementation, the web browser may perform the functions of the toolbar. In yet another implementation, the toolbar is a process separate from and running concurrently with the web browser. In this other implementation, the toolbar may interface between the web browser and network 250.

Toolbar software 430 may be automatically activated upon initiation of the web browser. Alternatively, toolbar software 430 may be activated when instructed by a user. In either case, the toolbar may take the form of a user interface that provides an extension to the web browser (e.g., provides additional functionality not provided by the web browser).

Figure 5:
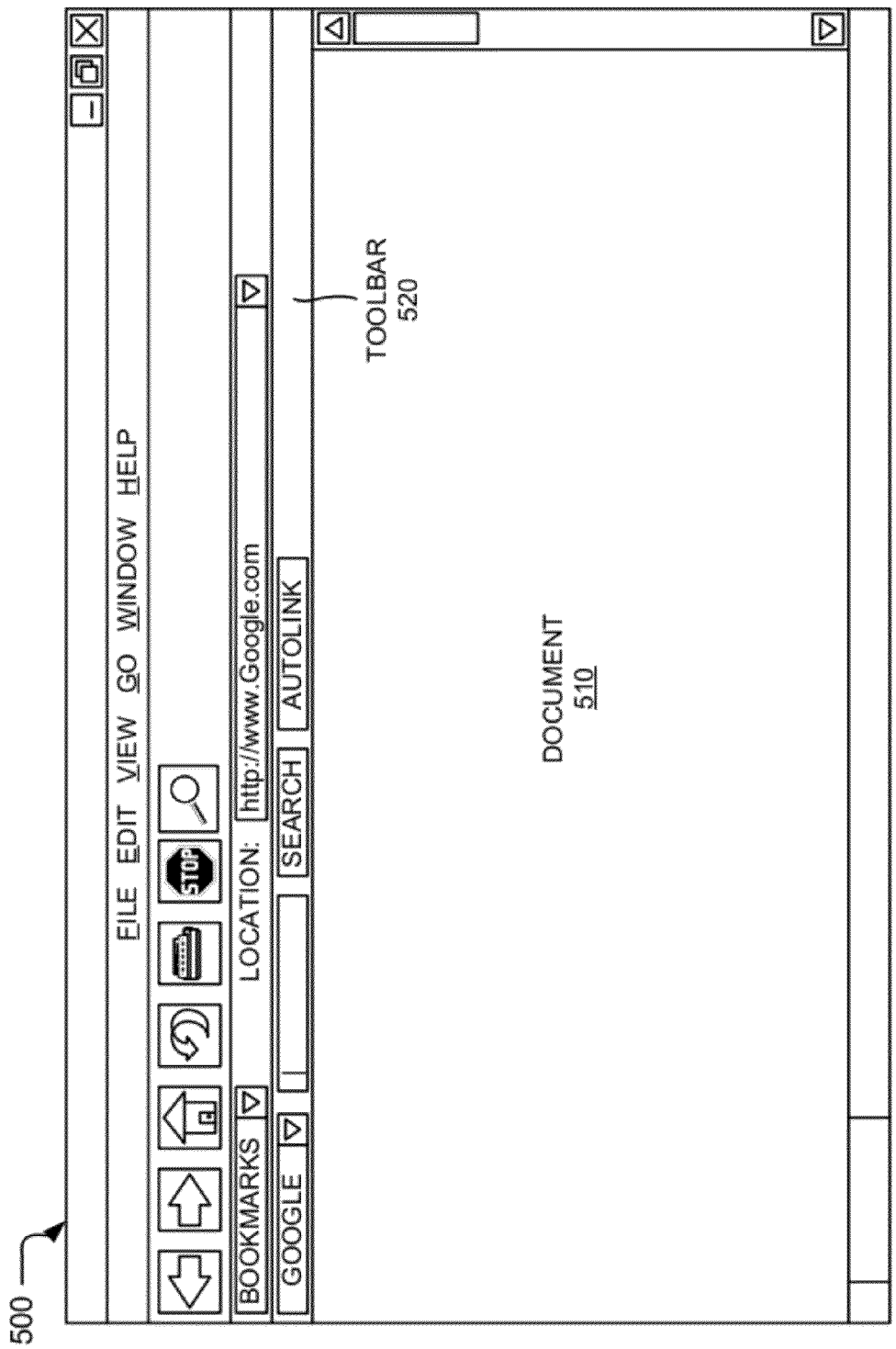
FIG. 5 is an exemplary diagram of a graphical user interface that may include a toolbar according to an implementation consistent with the principles of the invention.

FIG. 5 is an exemplary diagram of a graphical user interface 500 that may include a toolbar according to an implementation consistent with the principles of the invention. In this implementation, graphical user interface 500 may correspond to a web browser window that currently displays a document 510.

Graphical user interface 500 may include a toolbar 520 that may be implemented by toolbar software 430 executed by a client 210. Toolbar 520 may include one or more search boxes, software buttons, and/or menu elements selectable by a user to initiate different functions by toolbar 520. In this case, a user may activate a function of toolbar 520 by entering information into a search box and/or selecting one of the software buttons and/or menu elements. According to an implementation consistent with the principles of the invention, one of the functions performed by toolbar 520 may include an autolink function that supplements items in a currently displayed document with useful information associated with those items. The autolink function will be described in more detail below.

Exemplary Processing

FIGS. 6A-6C are flowcharts of exemplary processing for presenting useful information relating to an item in a document according to an implementation consistent with the principles of the invention. Processing may begin with a client 210 receiving a document (block 605) (FIG. 6A). In one implementation, a user uses a web browser associated with client 210 to locate a web document on a network, such as the Internet. The user may locate the document by entering an address (e.g., a uniform resource locator (URL)) into an address box of the web browser or by performing a search based on a search query entered into a search box associated with a search engine (e.g., entering a search term into the search box of toolbar 520 (FIG. 5)).

Toolbar 520 may strip the formatting from the document and analyze the contents of the document to recognize item(s) of information in the document (blocks 610 and 615). An "item" may refer to any type of information that may be identified based on pattern matching. For example, many types of information may differ in content, but match in the general pattern of the characters they contain. Exemplary types of information that may match in the general pattern of the characters they contain may include postal addresses, telephone numbers, flight information, traffic information, product identification information, tracking numbers, document identification numbers (e.g., International Standard Book Number (ISBN), International Standard Serial Number (ISSN), and Digital Object Identifier (DOI)), and vehicle identification numbers (VINs). Other types of information will be readily apparent to those skilled in the art.

A postal address, for example, may contain information commonly associated with an address, such as a number (street or zip code), a street name, a street type (road, street, lane, etc.), a city name, and a state name in relative close proximity to one another. Similarly, tracking numbers for a particular company may contain the same format. For example, the United Parcel Service (UPS) uses the following three formats for its tracking numbers: 1Z 000 000 00 0000 000 0; 0000 0000 0000; and T000 0000 000. Therefore, these patterns of characters may be used to identify UPS tracking numbers. The other types of information identified above may contain their own patterns of characters.

Certain types of items are easy to recognize with high confidence and do not require much processing power or large sets of data. These types of items will hereafter be referred to as "client items." Examples of client items might include tracking numbers, document identification numbers, and vehicle identification numbers. Other types of items are not as easy to recognize with high confidence and require much more processing power and/or large sets of data. These types of items will hereafter be referred to as "server items." Examples of server items might include postal addresses, telephone numbers, flight information, and product identification information.

For client items, toolbar 520 may perform pattern matching against a predetermined set of item patterns to recognize the items. For example, a vehicle identification number contains seventeen characters, including a world manufacturer identifier section (three characters), a vehicle descriptor section (six characters), and a vehicle identifier section (eight characters). Each of the sections includes characters from a known, limited, set of characters. Toolbar 520 may use this information to recognize a vehicle identification number. Similarly, a document identification number, such as an ISBN, contains ten characters, including a country of origin or language code (one character), a publisher code (three characters), an item number (five characters), and a check digit (one character). The ISBN includes only numbers and the check digit provides a way to easily verify that a ten digit number is actually an ISBN. Toolbar 520 can recognize client items with high confidence, but typically less than total confidence.

For server items, toolbar 520 may perform some basic pattern matching to recognize the items. For example, a postal address may contain information typically associated with an address, such as a street number, a street name, a street type (full or abbreviated), a city name, a state name (full or abbreviated), and a zip code. Toolbar 520 may identify one or more of these pieces of information and conclude that the item possibly corresponds to a postal address. Toolbar 520 recognizes server items with lower confidence.

For a client item recognized by toolbar 520 (block 620), toolbar 520 may verify the client item by locating keywords near the item (block 625) (FIG. 6B). "Near" may be defined as any number of characters, words, or terms to the left and/or right of an item. In one implementation, 64 words/terms to the left and right of an item may be analyzed for the presence of keywords.

For each type of client item, toolbar 520 may maintain a list of keywords that typically appear in a document near that type of client item. For example, possible keywords for a tracking number might include "ship," "shipment," "shipping," "track," "tracking," "delivery," and "package." In one implementation, toolbar 520 may consider the appearance of a single one of the keywords near an item as verification that the item was correctly recognized. In another implementation, toolbar 520 may require the appearance of more than one keyword near an item to verify that the item was correctly recognized. The appearance of no keywords may be considered to be a false recognition and the item may, thereafter, be ignored.

Toolbar 520 may identify a link for the client item (block 630). The link may reference a server, such as server 220 (FIG. 2). The server may handle the reference by redirecting the reference to a document that contains useful information associated with the item. Alternatively, the link may reference a document containing useful information directly.

Toolbar 520 may present the link to the user in several ways. For example, toolbar 520 may insert the link into the document, possibly replacing the item in the document with a link whose anchor text matches the characters of the item. In this case, the user might perceive no difference in the contents of the document, but the item, in this case, would be underlined (or otherwise visually distinguished) to indicate that the item corresponds to a link, as is well known in the art. Alternatively or additionally, toolbar 520 may notify the user of the link via a button on the toolbar, a pop-up text block or window, and/or a drop-down list.

At some point, toolbar 520 may receive selection of the link (block 635). For example, when the link takes the form of a link inserted into the document, selecting the link may correspond to clicking on the link. When the link takes the form of a toolbar button or an element in a pop-up text block or window or a drop-down list, selecting the link may correspond to clicking on the button or the element.

As explained above, the link may reference server 220. Therefore, in response to selection of the link, toolbar 520 may send a message to server 220 (block 640). The message may include the client item and identify the type of item that the client item is. Server 220 may redirect to a document that includes useful information associated with the item (block 645). Server 220 may store information that relates different types of items to documents that contain useful information associated with those items. For a vehicle identification number, for example, server 220 may identify a document on a web site that provides information about specific vehicles, such as the CARFAX web site. Similarly, for a document identification number, server 220 may identify a document on a web site that provides information relating to the item, such as a web site associated with a publisher or an author of the document or a web site that sells a document identified by the item.

Server 220 may cause the identified document (i.e., the document with the useful information) to be appropriately populated with the client item. For example, in the case of a vehicle identification number, server 220 may cause the appropriate field(s) of the document on the CARFAX web site to be populated with the vehicle identification number. Accordingly, the user may be presented with a document that contains useful information associated with the item.

For a server item recognized by toolbar 520 (block 620) (FIG. 6A), toolbar 520 may send a portion of the document containing the item to a server, such as server 220 (block 650) (FIG. 6C). The portion of the document sent to the server may be less than the entire document and may include the item and any number of characters, words, or terms to the left and/or right of the item. In one implementation, the portion of the document may include the item and 12 words/terms to the left and right of the item. By sending only a portion of the document rather than the entire document, network traffic may be reduced.

Server 220 may analyze the portion of the document to recognize the item (block 655). Server 220 may perform known techniques, which may be processing-intensive or require large sets of data, to recognize the item from the portion of the document it received from toolbar 520. For example, when the item corresponds to a full or partial postal address, server 220 may perform a known address recognition technique to recognize the postal address.

Server 220 may identify the recognized item to toolbar 520 (block 660). For example, server 220 may inform toolbar 520 of the part of the document that contains the recognized item. For example, server 220 may identify the full postal address to toolbar 520. Alternatively or additionally, server 220 may mark the document portion to identify the start and end of the recognized item.

Toolbar 520 may receive notification of the recognized item from server 220 and identify a link for the server item (block 665). The link may reference a server, such as server 220 (FIG. 2). The server may handle the reference by redirecting the reference to a document that contains useful information associated with the item. Alternatively, the link may reference a document containing useful information directly.

As described above, toolbar 520 may present the link to the user in several ways. For example, toolbar 520 may insert the link into the document, possibly replacing the item in the document with a link whose anchor text matches the characters of the item. In this case, the user might perceive no difference in the contents of the document, but the item, in this case, would be underlined (or otherwise visually distinguished) to indicate that the item corresponds to a link, as is well known in the art. Alternatively or additionally, toolbar 520 may notify the user of the link via a button on the toolbar, a pop-up text block or window, and/or a drop-down list.

At some point, toolbar 520 may receive selection of the link (block 670). For example, when the link takes the form of a link inserted into the document, selecting the link may correspond to clicking on the link. When the link takes the form of a toolbar button or an element in a pop-up text block or window or a drop-down list, selecting the link may correspond to clicking on the button or the element.

As explained above, the link may reference server 220. Therefore, in response to selection of the link, toolbar 520 may send a message to server 220 (block 675). The message may include the server item and identify the type of item that the server item is. Server 220 may redirect to a document that includes useful information associated with the item (block 680). Server 220 may store information that relates different types of items to documents that contain useful information associated with those items. For a postal address, for example, server 220 may identify a document on a web site that provides a map of the address. Server 220 may cause the appropriate field(s) of the document to be populated with the address so that map information associated with the address may be obtained. Accordingly, the user may be presented with a document that contains useful information associated with the item.

Any or all of the autolink operations can be turned on or off or preset by the user. For example, the user may select to perform autolink operations only on client items or server items. Alternatively or additionally, the user may select to only perform autolink operations on client items and/or server items when the user indicates, such as by clicking on a button in toolbar 520. Alternatively or additionally, the user may select to only add links to a document when the user indicates, such as by clicking on a button in toolbar 520.

Also if a document already contains a link associated with an item, toolbar 520, in one implementation, may leave the link alone. In this case, toolbar 520 may inform the user of the presence of the item in the document. Toolbar 520 may give the user the option of accessing a document with useful information associated with the item using, for example, a button on toolbar 520, a pop-up text block or window, and/or a drop-down list.

EXAMPLES

Tracking Number Example

Figure 7:
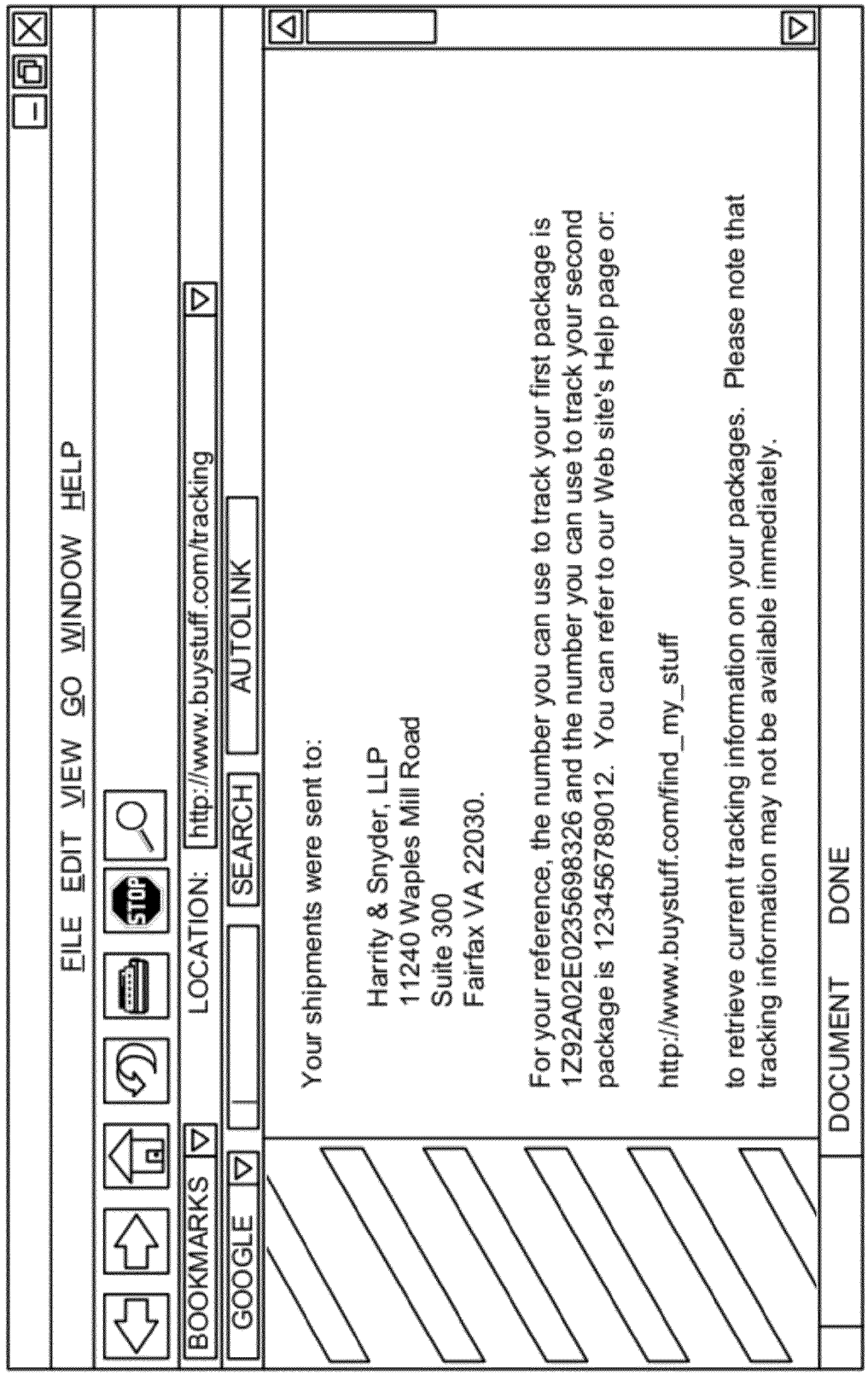
FIGS. 7-10 are exemplary diagrams of information that may be presented to a user when an item corresponds to a tacking number.

FIGS. 7-10 are exemplary diagrams of information that may be presented to a user when an item corresponds to a tacking number. As shown in FIG. 7, the user has accessed a document associated with a company from which it appears the user purchased something. The toolbar may strip the formatting from the document and analyze the contents of the document to recognize item(s) of information in the document.

The toolbar may perform pattern matching and identify two tracking numbers: 1Z92A02E0235698326 and 123456789012 in the document. Assume that the toolbar identifies the first tracking number (i.e., 1Z92A02E0235698326) as a UPS tracking number and the second tracking number (i.e., 123456789012) as a Federal Express (FedEx) tracking number.

As explained above, the toolbar may recognize these tracking numbers with high confidence, though less than total confidence. Therefore, the toolbar may verify the tracking numbers by determining whether certain keywords appear in the document near the tracking numbers. In this case, the toolbar may identify the keywords "track" and "package" near the tracking numbers.

Figure 8:
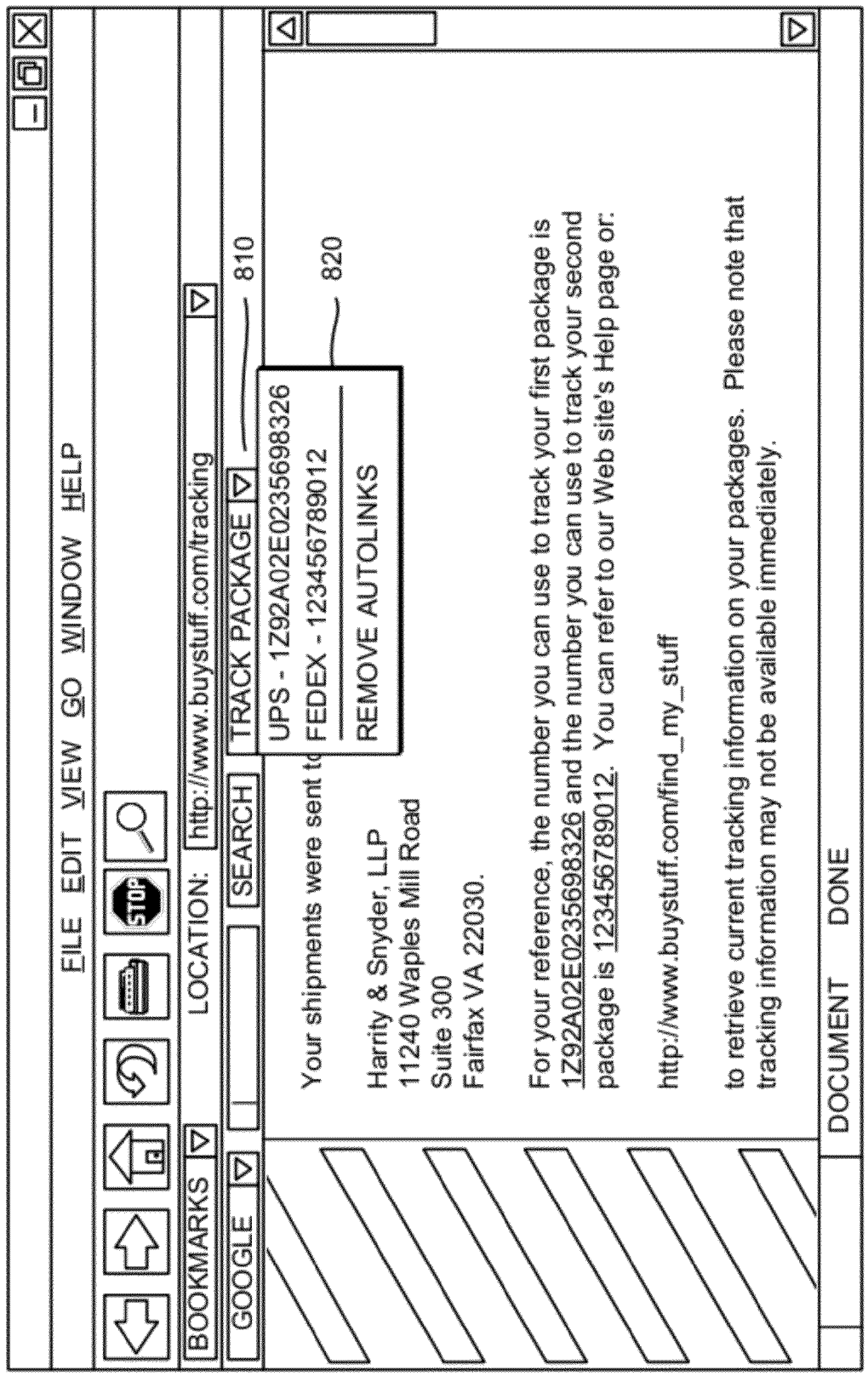

In one implementation, the toolbar may change or add one or more buttons on the toolbar based on what types of items the toolbar recognizes in the document. As shown in FIG. 8, the toolbar may replace the "autolink" button with a "track package" button 810 based on the toolbar's recognition of one or more tracking numbers in the document. In an alternate implementation, the toolbar may leave the autolink button and simply add track package button 810. In yet another implementation, the autolink button may be used regardless of the type of item recognized in the document (i.e., no button will be replaced or added). In this case, link information may be presented to the user via, for example, a drop-down list or a pop-up text block or window.

The toolbar may identify links for the tracking numbers. As shown in FIG. 8, the toolbar may insert links into the document. For example, the underlining of the tracking numbers in FIG. 8 is intended to mean that the tracking numbers have been replaced with links whose anchor text matches the characters of the tracking numbers. As further shown in FIG. 8, the toolbar may identify and provide links to the tracking numbers via a drop down list 820. Drop down list 820 may optionally label the first tracking number as a UPS tracking number and the second tracking number as a FedEx tracking number. Drop down list 820 may also optionally include an element for removing all autolinks (i.e., turning off the autolink feature).

Figure 9:
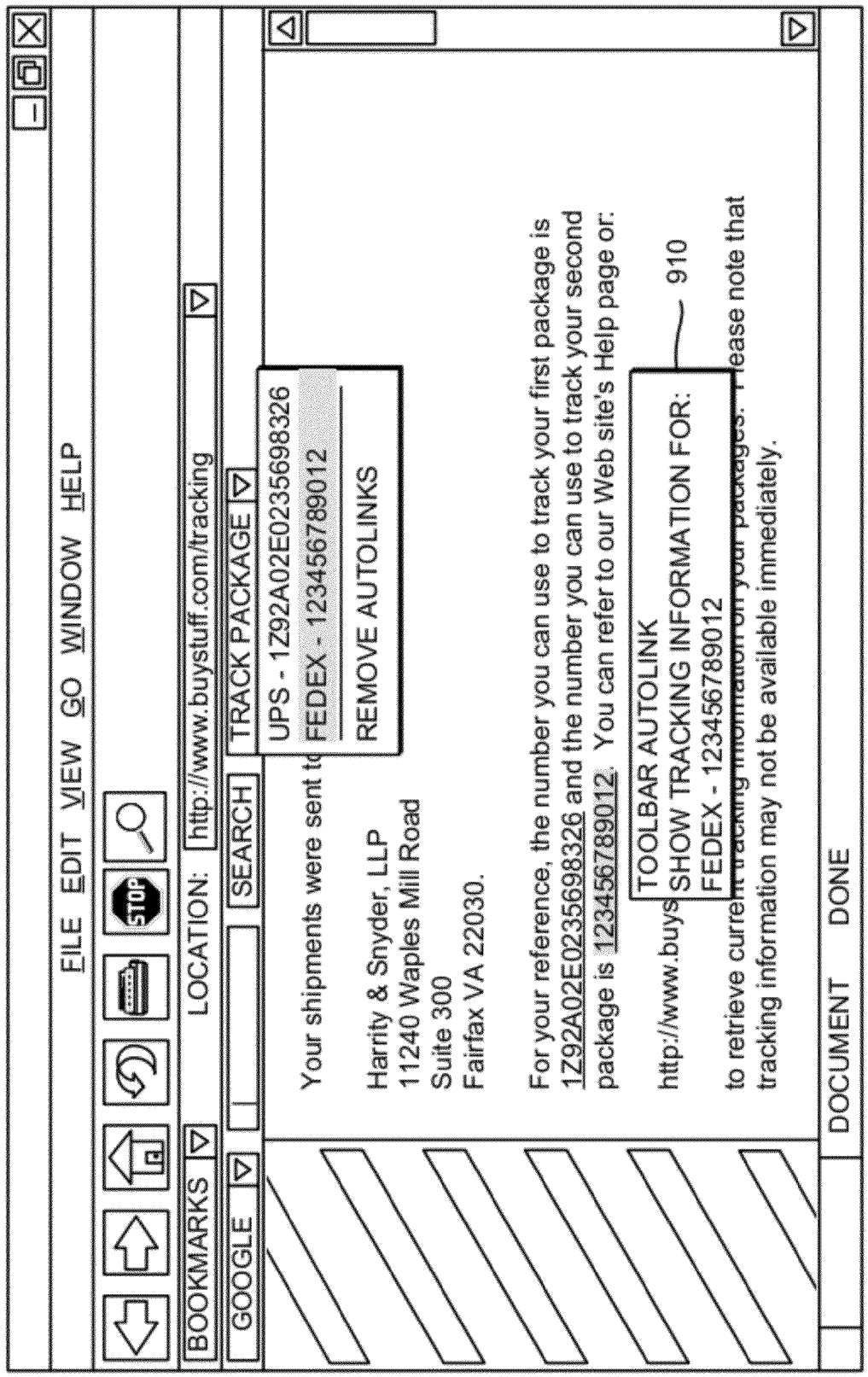

In one implementation, the user may select track package button 810 on the toolbar to visually distinguish in some manner (e.g., highlight) the tracking numbers recognized in the document. Each selection of the track package button 810 may cause a next tracking number, if any, to be visually distinguished. As shown in FIG. 9, the FedEx tracking number is visually distinguished. As also shown in FIG. 9, a pop-up text block or window 910 may be presented to the user.

Assume that the user selects the FedEx tracking number. The user may select the tracking number by selecting (e.g., clicking) the link inserted into the document, the corresponding element in drop down list 820, or pop-up text block or window 910. As explained above, selection of an item may cause the toolbar to send a message identifying the item and the item type to a server. In this case, the toolbar may send a message to the server with the tracking number 123456789012 and identifying the item as a FedEx tracking number. The server may redirect to a document on the FedEx web site and may optionally populate the appropriate fields in the document to obtain tracking information associated with the FedEx tracking number. The server may cause the tracking information to be sent to the toolbar.

Figure 10:
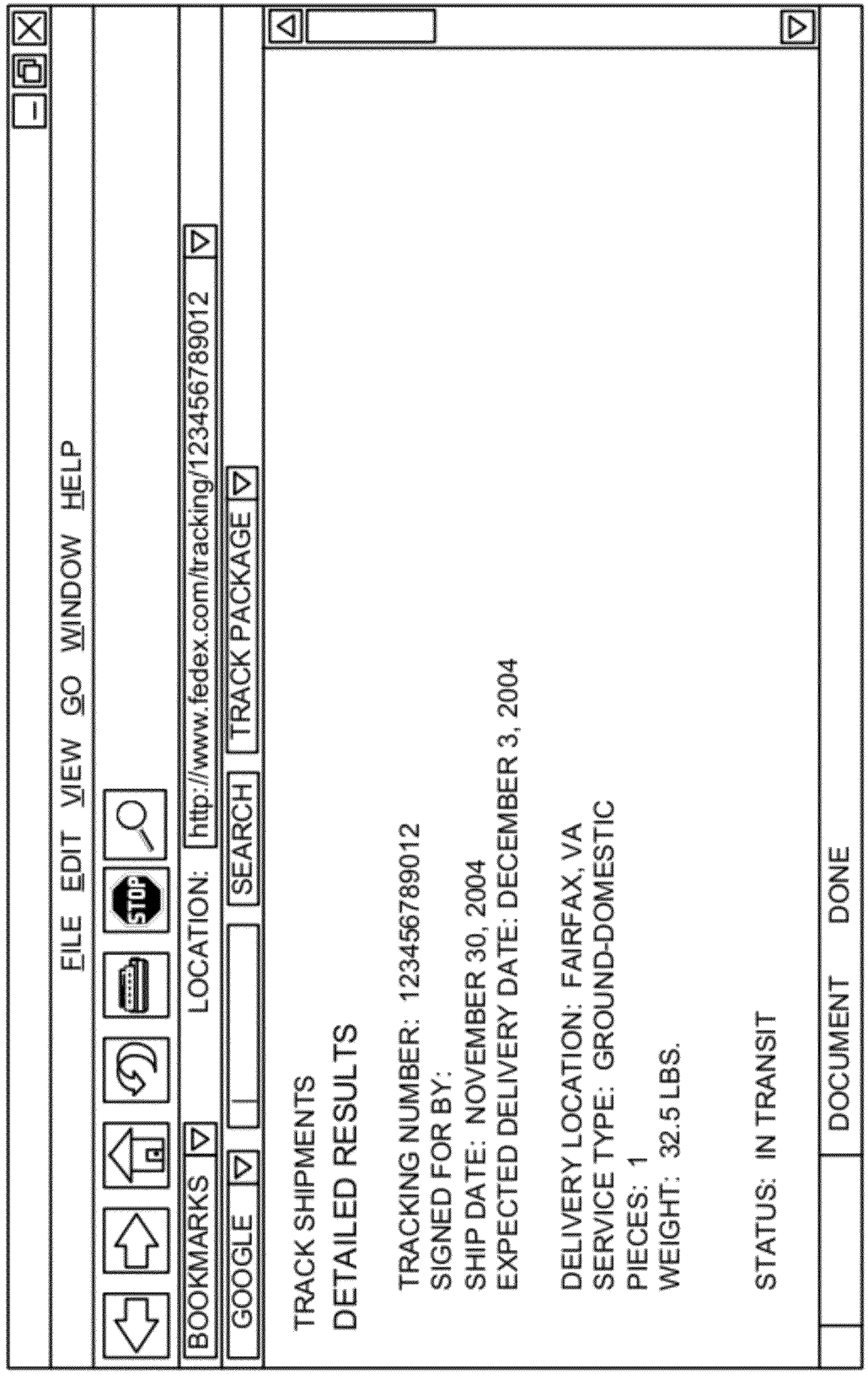

As shown in FIG. 10, the toolbar may present to the user a document with useful information associated with the FedEx tracking number. In this case, the document corresponds to a document on the FedEx web site that contains tracking information associated with the tracking number.

Postal Address Example

Figure 11:
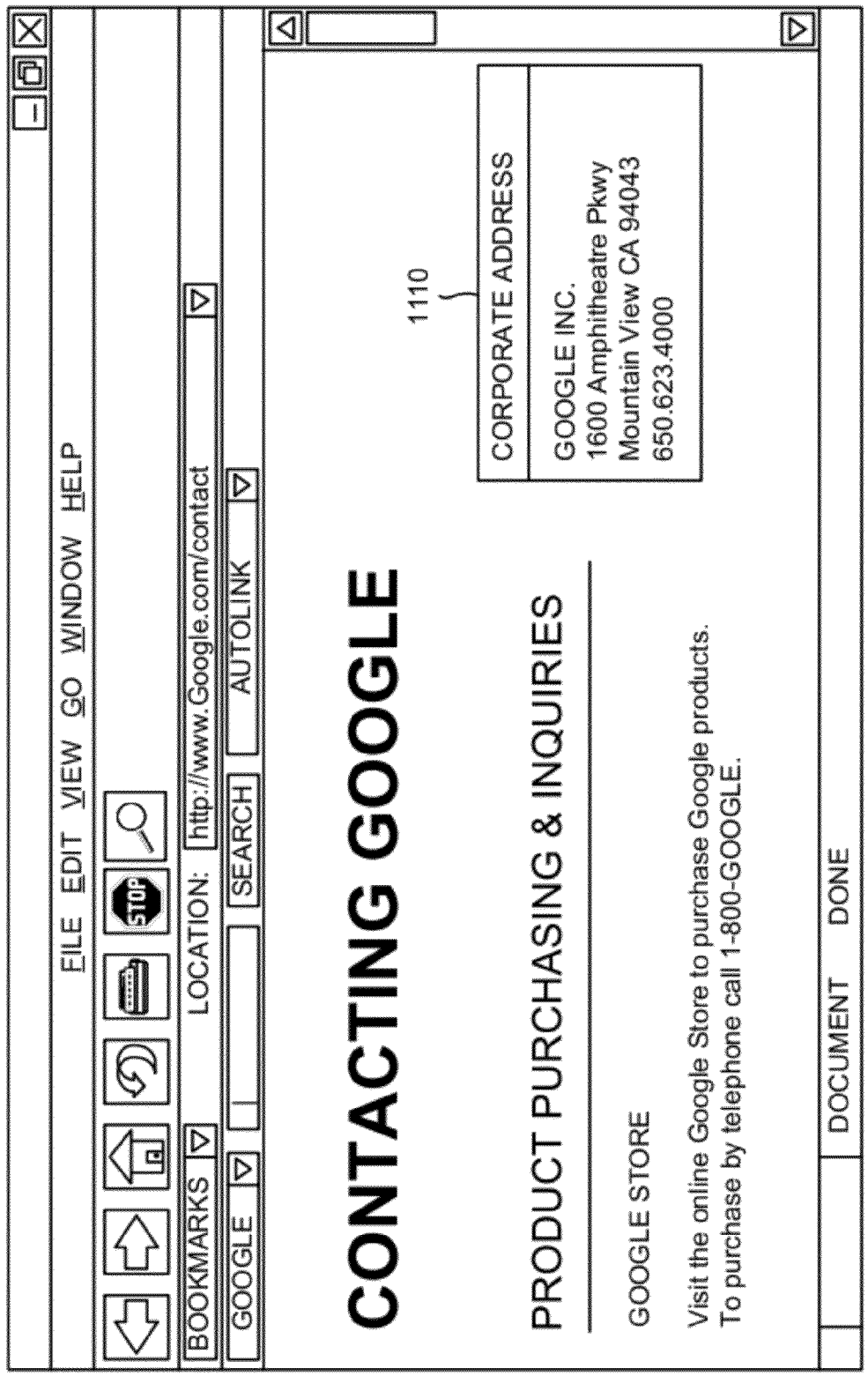
FIGS. 11-14 are exemplary diagrams of information that may be presented to a user when an item corresponds to a postal address.

FIGS. 11-14 are exemplary diagrams of information that may be presented to a user when an item corresponds to a postal address. As shown in FIG. 11, the user has accessed a document associated with a company. The toolbar may strip the formatting from the document and analyze the contents of the document to recognize item(s) of information in the document.

The toolbar may perform pattern matching and identify what appears to be a postal address. As explained above, the toolbar, in one implementation, may not have the requisite processing power and/or data set(s) to appropriately recognize a server item, such as a postal address. Accordingly, the toolbar may perform some basic pattern matching to recognize information commonly associated with a postal address, such as a street number, a street name, a street type (full or abbreviated), a city name, a state name (full or abbreviated), and a zip code. In this case, the toolbar may recognize "Pkwy" as an abbreviation of a street type, "Mountain View" as the name of a city, "CA" as an abbreviation of a state name, and "94043" as a number containing an appropriate number of characters to match a zip code.

The toolbar may send a portion of the document containing the possible postal address to a server. The portion of the document sent to the server, in this case, may include everything in corporate address block 1110. The server may perform known recognition techniques to recognize the possible postal address it received from the toolbar. The server may identify the recognized postal address to the toolbar. For example, the server may inform the toolbar that the postal address corresponds to "1600 Amphitheatre Pkwy, Mountain View, Calif. 94043." Alternatively or additionally, the server may indicate the start and end of the postal address in the document portion.

Figure 12:
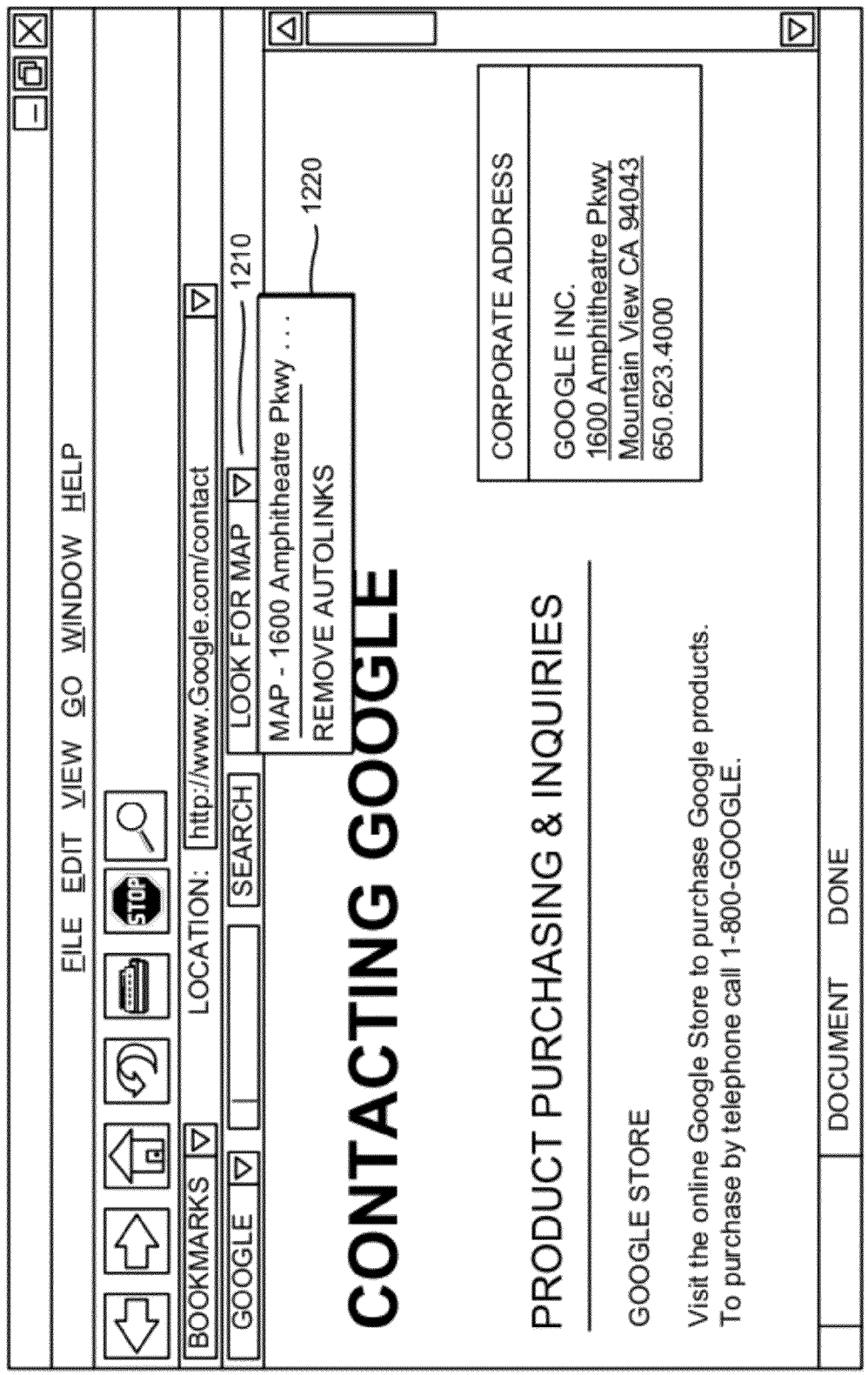

In one implementation, the toolbar may change or add one or more buttons on the toolbar based on what types of items the toolbar recognizes in the document. As shown in FIG. 12, the toolbar may replace the "autolink" button with a "look for map" button 1210 based on the toolbar's identification of one or more postal addresses in the document. In an alternate implementation, the toolbar may leave the autolink button and simply add look for map button 1210. In yet another implementation, the autolink button may be used regardless of the type of item recognized in the document (i.e., no button will be replaced or added). In this case, link information may be presented to the user via, for example, a drop-down list or a pop-up text block or window.

The toolbar may identify a link for the postal address. As shown in FIG. 12, the toolbar may insert a link into the document. For example, the underlining of the postal address in FIG. 12 is intended to mean that the postal address has been replaced with a link whose anchor text matches the characters of the postal address. As further shown in FIG. 12, the toolbar may identify and provide a link to the postal address via a drop down list 1220. Drop down list 1220 may optionally include an element for removing all autolinks (i.e., turning off the autolink feature).

Figure 13:
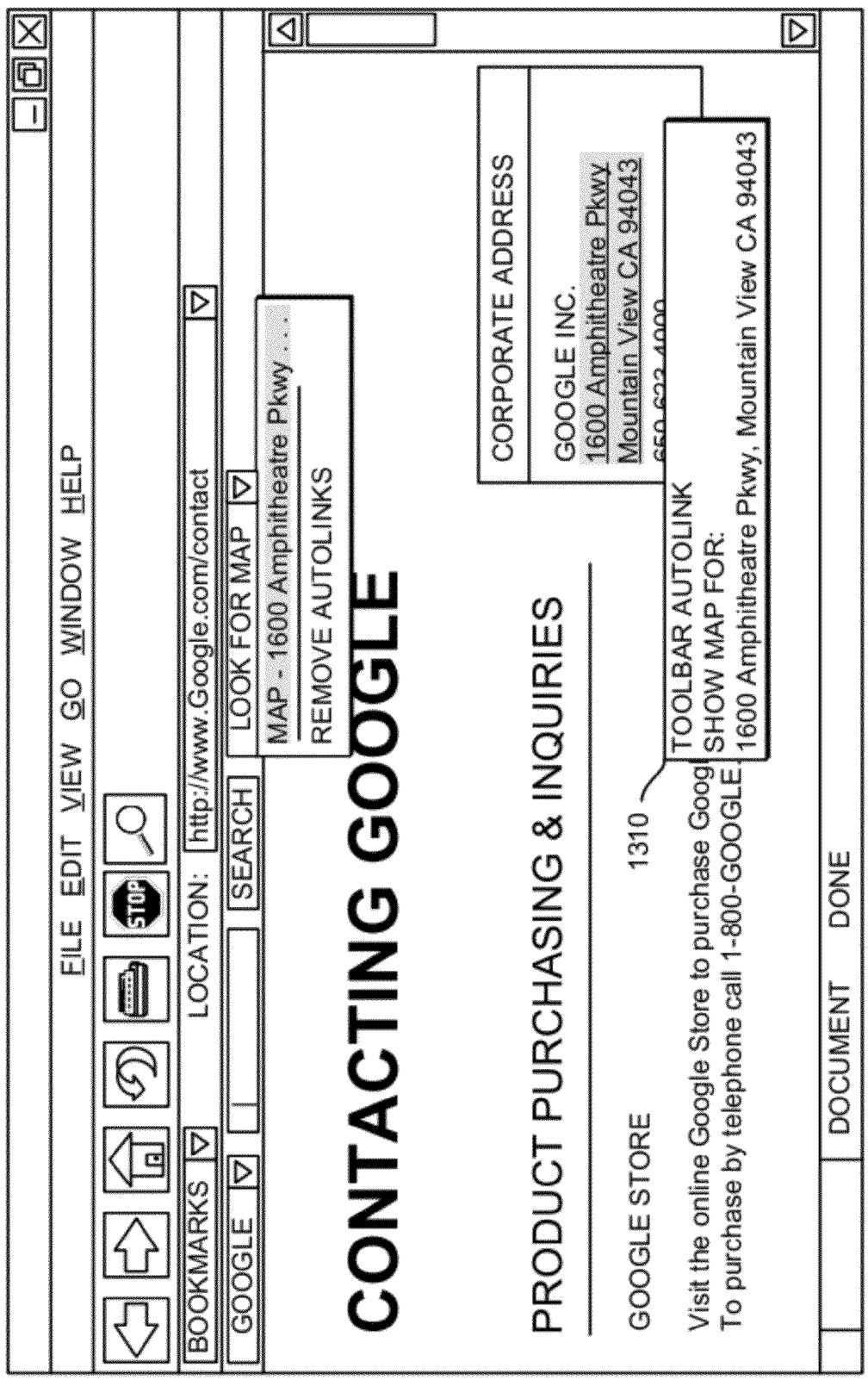

In one implementation, the user may select look for map button 1210 on the toolbar to visually distinguish in some manner (e.g., highlight) the postal address(es) recognized in the document. Each selection of the look for map button 1210 may cause a next postal address, if any, to be visually distinguished. As shown in FIG. 13, the 1600 Amphitheatre Pkwy address is visually distinguished. As also shown in FIG. 13, a pop-up text block or window 1310 may be presented to the user.

Assume that the user selects the 1600 Amphitheatre Pkwy address. The user may select the address by selecting (e.g., clicking) the link inserted into the document, the corresponding element in drop down list 1220, or pop-up text block or window 1310. As explained above, selection of an item may cause the toolbar to send a message identifying the item and the item type to a server. In this case, the toolbar may send a message to the server with the postal address "1600 Amphitheatre Pkwy, Mountain View, Calif. 94043" and identifying the item as a postal address. The server may redirect to a document on a map provider web site and may optionally populate the appropriate fields in the document to obtain map information associated with the postal address. The server may cause the map information to be sent to the toolbar.

Figure 14:
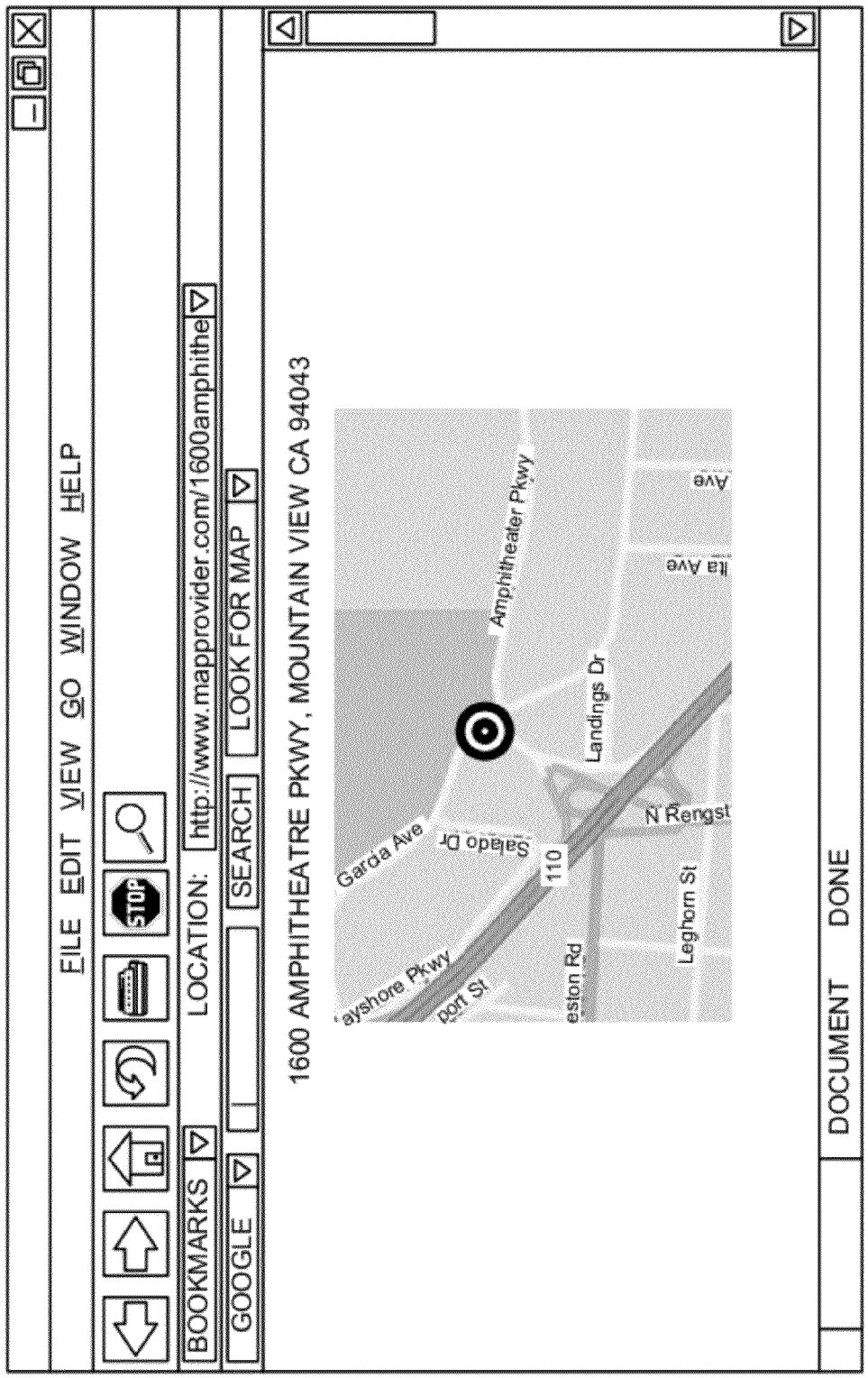

As shown in FIG. 14, the toolbar may present the user with a document with useful information associated with the postal address. In this case, the document corresponds to a document on a map provider's web site that contains map information associated with the postal address.

CONCLUSION

Systems and methods consistent with the principles of the invention may provide useful information associated with an item in a document.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 6A-6C, the order of the acts may be modified in other implementations consistent with the principles of the invention. Further, non-dependent acts may be performed in parallel.

Also, exemplary user interfaces have been described with respect to FIGS. 5 and 7-14. In other implementations consistent with the principles of the invention, the user interfaces may include more, fewer, or different pieces of information.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    recognizing, by a device, an item that is included in a first document, the first document including an e-mail that includes the item,
        where the item includes a plurality of characters,
        where the item is recognized based on a pattern of the plurality of characters,
        the item being recognized as a particular tracking number of a particular shipment based on the pattern of the plurality of characters corresponding to a pattern of characters of a tracking number of a shipment, and
        where the item is recognized independent of a particular content of the plurality of characters;
    determining, by the device and after recognizing the item, whether a keyword, of a plurality of keywords that are associated with tracking numbers of shipments, is located in the first document;
    disregarding, by the device, the item from further consideration when at least one keyword, of the plurality of keywords associated with the tracking numbers of shipments, is not located in the first document; and
    when the keyword, of the plurality of keywords associated with the tracking numbers of shipments, is located in the first document:
        identifying, by the device, a link associated with the item,
            where the link references a second document that includes information associated with the item,
                where the information, associated with the item and included in the second document, includes particular information associated with the particular shipment, the particular information including the particular tracking number, and
            where the second document is different than the first document;
        providing, by the device, the link in the first document; and
        providing, by the device, the first document, with the link, for presentation on a display,
            where the second document is provided when the link, in the first document, is selected.

2. The method of claim 1, where the plurality of keywords are based on a type of the item, the type of the item corresponding to a first type, and
    where a plurality of keywords, associated with a particular item of the first type, are different than a plurality of keywords associated with a particular item of a second type that is different than the first type.

3. The method of claim 1,
    where the particular information further includes at least one of:
    information identifying a shipping date of the particular shipment,
    information identifying an expected delivery date of the particular shipment, or
    information identifying a delivery location of the particular shipment.

4. The method of claim 1, where determining whether the keyword is located in the first document includes:
    determining whether the keyword is located within a particular distance of the item, and
        where the link is identified when the keyword is located, in the first document, within the particular distance of the item.

5. The method of claim 1, further comprising:
    recognizing another item, that is included in a third document, based on a pattern of a plurality of characters included in the other item,
    where the pattern, of the plurality of characters included in the other item, corresponds to a pattern of characters associated with a postal address, the item being recognized as a particular postal address;
    determining whether a keyword, of a plurality of keywords that are associated with a postal address, is located in the third document; and
    providing the third document, with a link that references a fourth document, for presentation on the display, where the fourth document includes a map including information that identifies the particular postal address.

6. The method of claim 1, further comprising:
recognizing another item, that is included in a third document, based on a pattern of a plurality of characters included in the other item,
where the pattern, of the plurality of characters included in the other item, corresponds to a pattern of characters associated with a vehicle identification number (VIN), the item being recognized as a particular VIN;
determining whether a keyword, of a plurality of keywords that are associated with a VIN, is located in the third document; and
providing the third document, with a link that references a fourth document, for presentation on the display,
where the fourth document includes information associated with the particular VIN.

7. The method of claim 1, further comprising:
recognizing another item, that is included in a third document, based on a pattern of a plurality of characters included in the other item,
where the pattern, of the plurality of characters included in the other item, corresponds to a pattern of characters associated with an International Standard Book Number (ISBN);
determining whether a keyword, of a plurality of keywords that are associated with an ISBN, is located in the third document; and
providing the third document, with a link that references a fourth document, for presentation on the display,
where the fourth document includes information associated with a particular ISBN corresponding to the item.

8. A device comprising:
a memory to store instructions; and
at least one processor to execute the instructions to:
identify an item, that is included in a first document, as a particular tracking number of a particular shipment, the first document including an e-mail that includes the item,
where the item is identified as the particular tracking number of the particular shipment independent of a particular content of the plurality of characters;
determine, after the item has been identified, whether at least one keyword, of a plurality of keywords associated with tracking numbers of shipments, is included in the first document,
where the plurality of keywords have been associated with the item prior to the item being identified in the first document,
disregard the item from further consideration when none, of the plurality of keywords associated with the tracking numbers of shipments, is included in the first document, and
when the at least one keyword, of the plurality of keywords associated with the tracking numbers of shipments, is included in the first document:
identify a reference, associated with the item, that identifies a second document,
where the second document includes information associated with the item,
where the information, associated with the item and included in the second document, includes particular information associated with the particular shipment, the particular information including the particular tracking number, and
where the second document is different than the first document,
provide the reference in the first document, and
provide the first document, with the reference, for presentation on a display,
where the second document is provided when the reference, in the first document, is selected.

9. The device of claim 8, where the at least one processor is to execute the instructions further to:
identify another item, that is included in the first document, based on a pattern of a plurality of characters included in the other item,
where the pattern, of the plurality of characters included in the other item, corresponds to a pattern of characters associated with information identifying a flight, the item being identified as information identifying a particular flight,
determine whether at least one keyword, of a plurality of keywords that are associated with information identifying a flight, is located in the first document, and
provide the first document, with a reference that identifies a third document, for presentation on the display,
where the third document includes information associated with the particular flight.

10. The device of claim 8, where the at least one processor is to execute the instructions further to:
identify another item, that is included in the first document, based on a pattern of a plurality of characters included in the other item,
where the pattern, of the plurality of characters included in the other item, corresponds to a pattern of characters associated with information identifying traffic, the item being identified as information identifying particular traffic,
determine whether at least one keyword, of a plurality of keywords that are associated with information identifying traffic, is located in the first document, and
provide the first document, with a reference that identifies a third document, for presentation on the display,
where the third document includes information associated with the particular traffic.

11. The device of claim 8, where the at least one processor is to execute the instructions further to:
identify another item that is included in the first document,
determine, after the other item has been identified, that another keyword, of the plurality of keywords, is included in the first document,
identify another reference, associated with the other item, that identifies a third document,
where the third document includes information associated with the other item, and
where the third document is different than the first document and the second document, and
provide the other reference for presentation on the display, with the reference, in the first document.

12. The device of claim 8, where the at least one processor is to execute the instructions further to:
identify another item that is included in a third document,
determine, after the other item has been identified, that a keyword, of a plurality of other keywords, is included in the third document,
where the plurality of other keywords have been associated with the other item prior to the other item being identified in the third document, and
where keywords, included in the plurality of keywords, are different than keywords included in the plurality of other keywords,
identify another reference, associated with the other item, that identifies a fourth document, where the fourth document includes information associated with the item, and
where the fourth document is different than the third document, and
provide the other reference in the fourth document.

13. A non-transitory computer-readable medium comprising:
one or more instructions, which when executed by at least one processor of one or more computer devices, cause the at least one processor to:
identify an item, that is included in a first document, as a particular tracking number of a particular shipment, the first document including an e-mail,
where the identified item includes a plurality of characters,
where the identified item is identified as the particular tracking number of the particular shipment based on a pattern of the plurality of characters corresponding to a pattern of characters associated with a tracking number of a shipment, and
where the identified item is identified independent of a particular content of the plurality of characters;
determine whether a keyword, of a plurality of keywords associated with tracking numbers of shipments, is included in the first document,
where the plurality of keywords correspond to keywords that have been associated with the identified item prior to the identified item being identified in the first document;
disregard the identified item from further consideration when at least one keyword, of the plurality of keywords associated with the tracking numbers of shipments, is not included in the first document; and
when the keyword, of the plurality of keywords associated with the tracking numbers of shipments, is included in the first document:
identify a link associated with the identified item,
where the link references a second document that includes information associated with the identified item, and
where the information, associated with the identified item, includes particular information associated with the particular shipment, the particular information including the particular tracking number;
provide the link in the first document; and
provide the first document, with the link, for presentation on a display,
where the second document is provided when the link, in the document, is selected.

14. The non-transitory computer-readable medium of claim 13, further comprising:
one or more instructions to identify another item that is included in the first document,
one or more instructions to determine, after the other item has been identified, that a keyword, of a plurality of other keywords, is included in the first document,
where the plurality of other keywords have been associated with the other item prior to the other item being identified in the first document, and
where keywords, included in the plurality of keywords, are different than keywords included in the plurality of other keywords,
one or more instructions to identify another link, associated with the other item, that references a particular document,
where the particular document includes information associated with the other item, and
where the particular document is different than the first document and the second document, and
one or more instructions to provide the other link in the first document.

15. The non-transitory computer-readable medium of claim 13,
where the particular information further includes the particular tracking number and at least one of:
information identifying a weight of the particular shipment, or
information indicating whether the particular shipment has been delivered.

16. The non-transitory computer-readable medium of claim 13, further comprising one or more instructions to:
identify another item, that is included in the first document, based on a pattern of a plurality of characters included in the other item,
where the pattern, of the plurality of characters included in the other item, corresponds to a pattern of characters associated with an International Standard Serial Number (ISSN), the item being identified as a particular ISSN,
determine whether at least one keyword, of a plurality of keywords that are associated with an ISSN, is located in the first document, and
provide the first document, with a reference that identifies a different document, for presentation on the display,
where the different document includes information associated with the particular ISSN.

17. The non-transitory computer-readable medium of claim 13, where the plurality of keywords are based on a type of the identified item, and
where a plurality of keywords, associated with a particular item of a first type, are different than a plurality of keywords associated with a particular item of a second type that is different than the first type.

18. The non-transitory computer-readable medium of claim 13, further comprising:
one or more instructions to identify another item that is included in the first document,
one or more instructions to determine, after the other item has been identified, that another keyword, of the plurality of keywords, is included in the first document,
one or more instructions to identify another link to a particular document that includes information associated with the other item, and
one or more instructions to present, the link and the other link, in the document for presentation on the display.

* * * * *